No. 661,391. Patented Nov. 6, 1900.
T. A. BAKKEN.
SINGLETREE HOOK.
(Application filed June 2, 1900.)
(No Model.)

Witnesses
Fenton S. Belt,
Geo. P. Kingsbury.

Inventor:
Thore A. Bakken,
By Mason Fenwick Lawrence
Attorneys.

800
UNITED STATES PATENT OFFICE.

THORE A. BAKKEN, OF DE SOTO, WISCONSIN, ASSIGNOR OF ONE-HALF TO OTTO M. GILBERTSON, OF LA CROSSE, WISCONSIN.

SINGLETREE-HOOK.

SPECIFICATION forming part of Letters Patent No. 661,391, dated November 6, 1900.

Application filed June 2, 1900. Serial No. 18,843. (No model.)

*To all whom it may concern:*

Be it known that I, THORE A. BAKKEN, a citizen of the United States, residing at De Soto, in the county of Vernon and State of Wisconsin, have invented certain new and useful Improvements in Singletree-Hooks; and I do hereby declare the following to be a full, clear, and exact description of the invention, such as will enable others skilled in the art to which it appertains to make and use the same.

This invention relates to improvements in singletree-hooks, and particularly to that class of hooks which are provided with guards for holding the trace or trace-fastenings in place.

It consists in a hook having an attaching ring portion or ferrule, a series of inwardly-projecting teeth in the said ferrule for engaging the material of the singletree to prevent the hook from turning thereon and to fasten it more securely in position, and a guard adapted to be secured to the singletree, so as to prevent a trace from becoming accidentally unhooked.

It also consists in certain other novel constructions, combinations, and arrangements of parts, as will be hereinafter more fully described, illustrated, and claimed.

Figure 1:
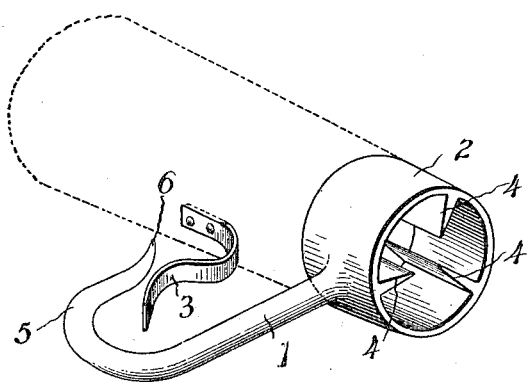
Figure 2:
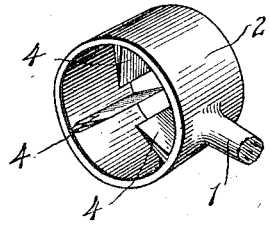

In the accompanying drawings, Figure 1 represents a perspective view of a singletree hook and guard, constructed in accordance with the present invention. Fig. 2 represents a detail perspective view of the attaching end of the hook.

1 in the drawings represents a singletree-hook, 2 an attaching ring or ferrule, and 3 a guard. In providing singletrees with hooks it is desirable to so form them that tugs or traces may be readily attached and detached therefrom and yet will not become accidentally detached when in use. It is also desirable to so form them that when they are secured to the singletrees they will be firmly fastened thereon and cannot twist or turn upon the same and will not be likely to get loose. For securing these features I construct the hook 1 with an attaching ring portion 2, which is open at each end and is adapted to be slipped upon the end of a singletree. In order to firmly secure the ferrule or ring 2 in position, I preferably provide the same with a series of inwardly-projecting wedge-shaped projections, as 4 4. As shown in the drawings, three of such projections may be used to advantage. The wedge-shaped projections 4 when driven into the material of the singletree not only cause the ferrule to be very firmly secured in position, but prevent the same from turning upon the end of the said singletree. I find, also, that a ring thus secured in position will not work loose. The hook portion of the device extends sufficiently far forward of the singletree to permit of its being turned inwardly to form a trace-engaging hook portion, as 5. It is preferable to turn the hook inwardly, because the trace or tug can be more easily attached and detached from the same.

In order to guard against the accidental displacement of the trace or a tug fastening from the said hook, I mount the guard 3 upon the singletree so that its projecting end extends into the hook portion 5. This guard is preferably formed of a flat piece of spring metal, which may be secured by screws or rivets to the singletree and which at its outer end is so bent as to form inclined approaches upon either side of the narrowest portion of the passage between the said hook and guard. The end portion of the guard is therefore more or less of a V shape, and it falls away from the outwardly-turned end portion 6 of the hook, so that a tug or trace fastening can be readily inserted in the hook, it being only necessary to exert a slight pressure upon the same to force it past the guard. The end of the guard which projects into the hook is also turned away to such an extent that the tug or tug-fastening may easily be inserted between it and the hook and by a slight pressure may be forced between the same, so as to detach the trace from the said hook. The guard thus not only prevents the accidental displacement of the tug or tug-fastening, but forms a guiding means for the introduction or detachment of the said tug or tug-fastening.

From the above description it will be seen that I am enabled by my invention to produce a very simple singletree-hook and yet one which can be made of the requisite amount of strength and can be so firmly attached to singletrees that it cannot work loose or readily come off the end of the same. The guard also forms a simple means for preventing the accidental detachment of the tug or tug-fastening and yet at the same time offers a very slight resistance to the forcible attaching or detaching of the said tug or tug-fastening. The construction and shape of the hook also is such that the tug or trace can be released or put in position without requiring slack in the trace or tug.

Having thus described my invention, what is claimed as new, and desired to be secured by Letters Patent, is—

A singletree-hook comprising an attaching ring or ferrule, a hook portion formed thereon having its free end turned inwardly but its point flared outwardly, a guard comprising a piece of spring metal attached to the singletree at one end and extending at its other end into the said hook, the free end of the said guard being bent first outwardly so as to approach the rounded portion of the hook end and then inwardly so that wedge-shaped approaches are formed in each direction opposite the rounded portion of the hook end, whereby a trace or trace-fastening may be inserted or detached by a light pull in either direction, substantially as described.

In testimony whereof I hereunto affix my signature in presence of two witnesses.

THORE A. BAKKEN.

Witnesses:
   W. T. NOTTINGHAM,
   WINNIE LANE.